June 2, 1970      E. J. AMDUR      3,515,658
ELECTROCHEMICAL SENSOR
Filed Jan. 26, 1968
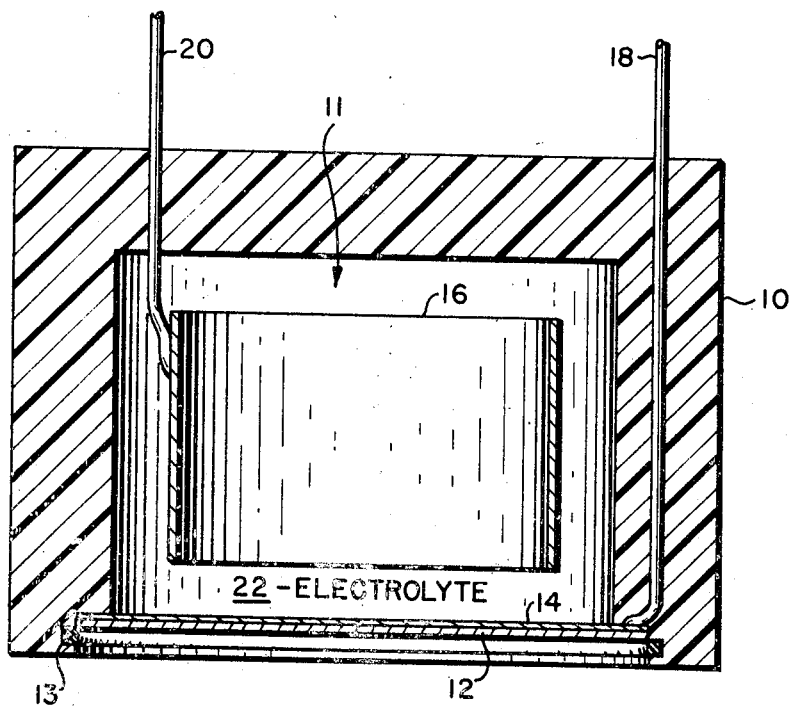
INVENTOR.
ELIAS J. AMDUR
BY
ATTORNEY.

United States Patent Office

3,515,658
Patented June 2, 1970

3,515,658
ELECTROCHEMICAL SENSOR
Elias J. Amdur, Minneapolis, Minn., assignor to Honeywell Inc., Minneapolis, Minn., a corporation of Delaware
Filed Jan. 26, 1968, Ser. No. 700,800
Int. Cl. G01n 27/54, 27/46
U.S. Cl. 204—195
7 Claims

ABSTRACT OF THE DISCLOSURE

An improved electrochemical cell for sensing and/or measuring gases wherein the cell electrolyte essentially contains sulfide ions and the anode comprises one of the following metals: silver, lead, copper, tin, mercury or mercury amalgams.

BACKGROUND OF THE INVENTION

This invention relates to cells for use in the electrochemical analysis of gases. More particularly, this invention relates to cells of the general type disclosed in, for example, U.S. Pat. No. 2,913,386, which issued to L. C. Clark, Jr., Nov. 17, 1959; U.S. Pat. No. 2,992,170 which issued to A. D. Robinson, July 11, 1961; U.S. Pat. No. 3,000,805 which issued to D. E. Carritt et al., Sept. 19, 1961; U.S. Pat. No. 3,160,577 which issued to R. W. Nolan, Jr., on Dec. 8, 1964, and U.S. Pat. No. 3,239,444 which issued to J. L. Heldenbrand on Mar. 8, 1966, the disclosures of which are all incorporated herein by reference.

Cells of the aforementioned type comprise in their simplest form an anode and a cathode bridged by an electrolyte. The cathode is adapted, by means of a diffusion membrane or suitably designed entrance port, to receive a sample to be sensed or analyzed. Upon the entrance of the sample into the cell, a chemical reaction occurs modifying the electrical characteristics of the cell.

Cells of this type have been used predominantly for oxygen sensing. However, other electro-reducible and electro-oxidizable gases such as the halogens, sulfur dioxide, hydrogen sulfide and the like may also be sensed and measured with these cells. Since the predominant use of the cell is in oxygen sensing, the invention will be described hereinbelow in that context although it is not limited thereto.

Nearly all of the prior art oxygen cells use chloride electrolytes with a silver anode or hydroxide electrolytes with a silver anode or other suitable anode metal, silver being the most common. The anode reaction product in such cases is silver chloride or silver oxide. For many applications anode-electrolyte combinations such as these are satisfactory although the active life of these cells is short and they must be frequently rejuvenated by cleaning and renewal of the electrolyte.

Some of the newer applications require the output signal of the cell to be highly amplified and also require a longer useful life for the cell. For example, high amplification of the output signal is required in order to provide close control of the gaseous composition of an atmospheric environment or to read low oxygen concentrations with greater sensitivity. Under highly amplified conditions irregularities in the anode potential become evident to such an extent that they tend to obscure the actual signal output of the cell. As as result of considerable investigation, it is believed that this undesirable low signal to noise ratio is caused primarily by anode reaction products, such as silver chloride or silver oxide, being forced off the anode by pressures resulting from the formation of additional reaction product at the interface between the anode metal and anode metal salt. The continued formation of the reaction product throughout the useful life of the cell has been observed to cause a progressive deterioration of the cell signal to noise ratio.

The useful life of the prior art cells is also limited because of the solubility of the reaction products at the anode. For example, in the most common cells, the chloride or oxide coating on the anode dissolves in the electrolyte allowing silver ions to migrate to the cathode where they are reduced to finely divided metallic silver which builds up in the cell causing many undesirable effects such as electrical shorting between the electrodes, electrical noise and drifting of the cell output signal.

It is therefore an object of this invention to provide a cell having improved life and the output of which can be amplified with an improved signal to noise ratio.

This objective is achieved by providing an electrolyte containing sulfide ions and an anode selected from a group consisting of silver, lead, copper, tin, mercury or mercury amalgams. The reaction product resulting from sulfide ions and a metal anode selected from the aforementioned group is very stable, adheres very strongly to the anode and is very insoluble. Noisiness is substantially eliminated and the output of the cell can be highly amplified. Since the reaction product is very insoluble, transport through the cell to the cathode is essentially eliminated. A cell of increased life is therefore provided with an improved signal to noise ratio which does not deteriorate in service.

BRIEF DESCRIPTION OF THE DRAWING

The sole figure in the drawing is a schematic sectional view of an electrolytic cell employing an improved electrolyte-anode combination according to this invention.

DESCRIPTION OF THE PREFERRED EMBODIMENTS

Referring to the drawing, reference numeral 10 identifies a cylindrical housing defining a chamber, generally designated as 11. Housing 10 is closed at its lower end by a membrane 12 which is permeable to the gas or gases to be detected or measured. Suitable membrane materials are well known in the art. Membrane 12 is held in place against the lower end of housing 10 by a suitable securing means such as an O-ring 13.

In this embodiment of the invention, a cathodic inner layer 14 of microapertured gold foil is carried by membrane 12 on or near its inner surface. An anode member 16, which in this embodiment takes the form of a cylindrical silver member, is shown supported inside chamber 11. Cathode 14 is contacted by electrical lead 18; anode 16 is contacted by electrical lead 20. Both electrodes are adapted to be connected into any of the many circuits known in the art for use with cells of this type. Both the anode and cathode may take other forms and positions within the cells as is obvious from the prior art.

In accordance with this invention, anode 16 may be made up of silver, lead, copper, tin, mercury and alloys or amalgams thereof, hereinafter referred to simply as alloys thereof. The anode electrode may take many forms such as a solid metal electrode or an electrode having a suitable metal of the group coated on its surface, an alloy of metals, or the like. The only requirement in accordance with this invention is that the electrode be made up essentially of one of more of the metals in the aforementioned group. By "essentially" it is meant that the composition of the electrode be such that the metal or metals used from the aforementioned group are free to function in accordance with this invention.

In the preferred form, the cathode is gold or platinum, however, other cathode materials known in the art may be utilized. For example, if an operating potential may be applied to the cell, the cathode may be any conductive material which is inert with respect to the electrolyte but which will provide electrons to the gas to be measured or detected. Metals of the platinum group or gold are generally satisfactory. Any of the aforementioned group of anode materials is satisfactory in this regard also.

If a self-generating or galvanic cell is desired, then it is necessary that the cathode material be selected with respect to the anode material such that two dissimilar metals are provided wherein a galvanic coupling is achieved with the proper voltage difference to make the desired chemical reaction occur within the cell. For example, when silver, lead, copper or mercury is used as the anode, the cathode may be any metals of the platinum group or gold.

Chamber 11 also includes an electrolyte 22 which in accordance with this invention must contain sulfide ions as the predominant anion constituent of the electrolyte. Soluble sulfide salts, such as the alkaline earths, calcium sulfide for example, or ammonium sulfide and the like may be used as sources of the sulfide anions. The alkali metal sulfides, such as sodium, lithium and potassium sulfides are even more preferred.

Many solvents have been found suitable for use with soluble sulfide salts. For example, water, or polyhydric alcohols such as propylene glycol, ethylene glycol, glycerin, or mixtures thereof have been found satisfactory. A preferred electrolyte comprises a mixture of glycerin, water, and an alkali metal sulfide such as sodium sulfide. The preferred relative amounts of these constituents are 15–20% sulfide, 50–70% glycerin, balance water, by weight.

To illustrate the improvement of this invention, two cells were prepared and operated for a period of time sufficient to provide comparative data. The essential structures of these cells were identical. However, one cell utilized a sulfide electrolyte in accordance with this invention consisting of 9.8% sodium sulfide, 20.2% water, balance glycerine by weight. The anode was silver. The other cell (representative of the prior art) utilized a silver anode and an electrolyte consisting of 20% water, balance glycerine, saturated with potassium chloride.

Both cells were operated under essentially the same conditions. The sulfide cell was found to provide an amplified output with minor signal irregularities of less than 0.04% of signal after being in service for a period of greater than four and one-half months. On the other hand the chloride cell (representative of the prior art) was found to provide an amplified output with signal spikes of 0.18% of signal after being in service for only a period of 20 days. The signal to noise ratio was observed to deteriorate to 0.4% after an additional seven days of operation. Continued deterioration was observed with further service.

This invention is further illustrated by the following examples wherein the electrolyte used was glycerine containing 1 N sodium bicarbonate and 0.2 gm. sodium sulfide per milliliter. This electrolyte was used in a series of experimental cells. In these cells each electrode was provided with its own compartment filled with the electrolyte. The compartments were connected by a cross-bridge filled with potassium nitrate and agar. The cathodes were gold with a working area of 1.62 square centimeters.

Each of the anodes listed below was mounted in one of the experimental cells. The initial open circuit anode potential was measured versus a saturated calomel reference electrode. The cells were connected to a 100 ohm resistor and the cell current was measured. The cells were then energized greater than the amount necessary to produce a cell current of 200 microamperes and the cells were allowed to run approximately four days. They were then returned to 100 microamperes (considered normal cell output) for one day and the final anode potential was measured. The general appearance of the anode was noted. The following results were obtained.

| Anode | Ratio of anode area to cathode area | E.M.F. vs. calomel at 100 μa. (v.) | Signal noise ratio 100 μa. | Anode Appearance |
| --- | --- | --- | --- | --- |
| $Ag/Ag_2S$ | 10:1 | 0.820 | >1,000:1 | Smooth black amber electrolyte. |
| $Pb/PbS$ | 25:1 | 0.793 | >1,000:1 | Thin black amber electrolyte. |
| $Cu/Cu_2S$ | 25:1 | 0.843 | >1,000:1 | Smooth black amber electrolyte. |
| $Hg/HgS$ | 1:7 | 0.747 | >1,000:1 | Brown film, amber electrolyte. |
| $Sn/SnS$ | 10:1 | 0.946 | >1,000:1 | Brown film, amber electrolyte. |

Numerous objects and advantages of the invention have been set forth in the foregoing description, together with details of the structure and function of the invention. The disclosure, however, is illustrative only, and changes may be made in detail, especially in matters of shape, size, and arrangement of parts and non-essential constituents of the electrolyte and electrodes within the principle of this invention.

The embodiments of the invention in which an exclusive property or right is claimed are defined as follows:

1. An electrochemical cell for determination of the quantity of a gas selected from the group consisting of electro reducible and electro oxidizable gases contained in an environment comprising:
    (a) A first body defining a chamber with an opening across at least a portion of one surface of the chamber,
    (b) An anode selected from the group consisting of silver, lead, copper, tin, mercury and alloys thereof contained within said chamber in gas tight isolation, other than by said opening, from the environment external to said chamber,
    (c) A cathode within said chamber,
    (d) A gas permeable, liquid impermeable membrane across said opening,
    (e) An electrolyte within said chamber including sulfide ions.

2. The cell of claim 1 wherein the sulfide ions are supplied by a sulfide dissolved in a substantially aqueous solvent.

3. The cell of claim 1 wherein the sulfide ions are supplied by a sulfide dissolved in a solvent comprising a polyhydric alcohol.

4. The cell of claim 1 wherein the sulfide ions are supplied by a sulfide salt dissolved in a mixture comprising glycerin and water.

5. The cell of claim 1 wherein the sulfide ions are supplied by a sulfide selected from the group consisting of the alkaline earth sulfides and the alkali metal sulfides.

6. The cell of claim 5 wherein the electrolyte initially consists by weight essentially of about 15–20% sulfide, about 50–70% glycerin, balance water.

7. The cell of claim 1 wherein the sulfide ions are supplied by sodium sulfide.

References Cited

UNITED STATES PATENTS 3,235,477  2/1966  Keyser et al. _____ 204—195
3,304,243  2/1967  Capuano _____ 204—1.1

OTHER REFERENCES

Goates et al., "J. of the Am. Chem. Soc.," vol. 73, February 1951, pp. 707–708.

Ives et al., "Reference Electrodes," 1961, pp. 381–383

TA-HSUNG TUNG, Primary Examiner